Feb. 20, 1968     A. C. EISELE     3,369,788
UTILITY POLE MOUNTING BRACKET FOR ELECTRICAL SAFETY DEVICES
Filed Jan. 24, 1966     2 Sheets-Sheet 1

INVENTOR.
ALBERT C. EISELE
BY
Meyer, Tilberry & Body

INVENTOR.
ALBERT C. EISELE
BY
Meyer, Tiberry & Body

3,369,788
UTILITY POLE MOUNTING BRACKET FOR ELECTRICAL SAFETY DEVICES
Albert C. Eisele, Cuyahoga, Ohio
(2039 Wooster Road, Rocky River, Ohio 44116)
Filed Jan. 24, 1966, Ser. No. 522,596
5 Claims. (Cl. 248—221)

ABSTRACT OF THE DISCLOSURE

The disclosure pertains to the art of electrical power distribution and more particularly to a utility pole mounting bracket for electrical safety devices having a shape adapted to maintain the proper spacing relationship between a utility pole and/or the electrical safety devices.

In high voltage power distrbution lines it is usually provided that a circuit breaker is connected between the power line and the distribution feed line to prevent damage to electrical components in the feed line due to unavoidable overload conditions.

Another safety device commonly employed in conjunction with the circuit breaker is a lightning arrester which connects the power line to a ground line in the event of a high voltage lightning discharge likewise to prevent damage to the distribution network.

The operating characteristics of each of these safety devices differ but are such that it is necessary to mount each in a noninterfering relationship with respect to the other and the utility pole upon which both are supported. By noninterfering relationship it is meant that if either or both of the safety devices is caused to operate, the effect of such operation will not result in placing the other device in an unsafe condition or result in a hazardous situation due to the close proximity of one of the safety devices to the utility pole.

For instance, the significance of the spacing and positional relationship of a circuit breaker with respect to the utility pole in avoiding a hazardous condition may be appreciated when it is realized that the type of circuit breaker referred to includes a fusible metal alloy fuse element which when activated at voltages of around 7600 volts melts with considerable violence splattering hot metal from the circuit breaker. Thus it is desirable that the fuse element be pointed away and safely spaced from the utility pole to prevent injury to a lineman.

The mounting of a lightning arrester presents a different problem. An arrester of the type referred to herein is called an expulsion type arrester because of its manner in disconnecting a ground line. The operating characteristics of an expulsion type arrester are such that after the surge of voltage due to a lightning discharge is grounded, an explosive charge is activated to separate the ground line from the arrester to render it nonconductive. The power line is thus only momentarily connected to the ground line during the dangerous high voltage period. When expulsion of the ground line occurs, the free end, which was formerly attached to the bottom of the lightning arrester, is propelled in an uncontrolled fashion by the force of the explosive charge and may become entangled with other electrical components in the immediate vicinity such as the circuit breaker referred to above. Should this actually occur, then the power line may be accidentally grounded through the circuit breaker portions which are not insulated from the power line and remain "hot."

The problems of providing a noninterfering relationship referred to above are made even more acute by the present trend in high voltage distribution systems of eliminating the cross arms on utility poles in an attempt to improve the overall appearance and provide a less encumbered looking pole. This means that the circuit breaker and lightning arrester must be mounted directly on the pole instead of on the ends of widely spaced cross arms thus providing less available space to insure a noninterfering relationship.

With such a utility pole, it is a purpose of the present invention to provide a mounting bracket especially designed for mounting electrical safety devices directly to the pole in a noninterfering relationship.

In accordance with the invention, the mounting bracket comprises a base adapted for securing it directly to a utility pole having a pair of laterally spaced mounting arms, each diverging outwardly from the base in a common horizontal plane providing a mounting opening at the outer end thereof and one mounting arm being shorter than the other so that the mounting openings are offset with respect to each other.

In another aspect of the invention, it is further provided that a swivel connection extends from each mounting opening to permit individual angular adjustment of each electrical device mounted thereon, the offset relationship of the swivel connections being sufficient to assure substantially 120° of adjustment of each electrical device without either coming into interfering relationship.

The principal object of the invention is to provide a bracket which is simple in design, inexpensive to manufacture and convenient to use for supporting electrical safety devices directly on a utility pole characterized by the absence of any cross arms.

Another object is to provide a mounting bracket as referred to above which incorporates novel features designed specifically to support high voltage electrical safety devices directly to a utility pole in a noninterfering relationship with respect to each other and/or the pole.

A further object is to provide a bracket which will permit angular adjustment of such mounted electrical devices while maintaining safe clearance between each throughout the adjusted positions.

These and other objects will become more apparent by referring to the following description and drawings wherein.

Figure 1:
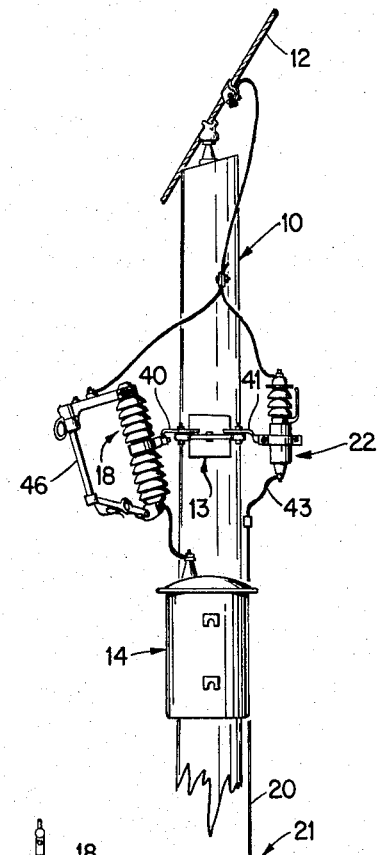
FIGURE 1 is a view of the upper end of a utility pole shown supporting a power line, a safety device mounting bracket constructed in accordance with the invention and a transformer.

Referring now to the drawings wherein the showings are for the purpose of illustrating a preferred embodiment of the invention only and not for the purpose of limiting same, FIGURE 1 shows a utility pole 10 supporting a high voltage line 12, a mounting bracket 13 and a transformer 14. The mounting bracket 13, which will be described hereinafter in detail, supports a circuit breaker 18 and a lightning arrester 22. A ground line 20 running down the side of the pole 10 to a ground connection, represented at 21, is connected on the lower end of the lightning arrester 22 which is electrically connected in parallel with the circuit breaker 18 to the power line 12.

Figure 2:
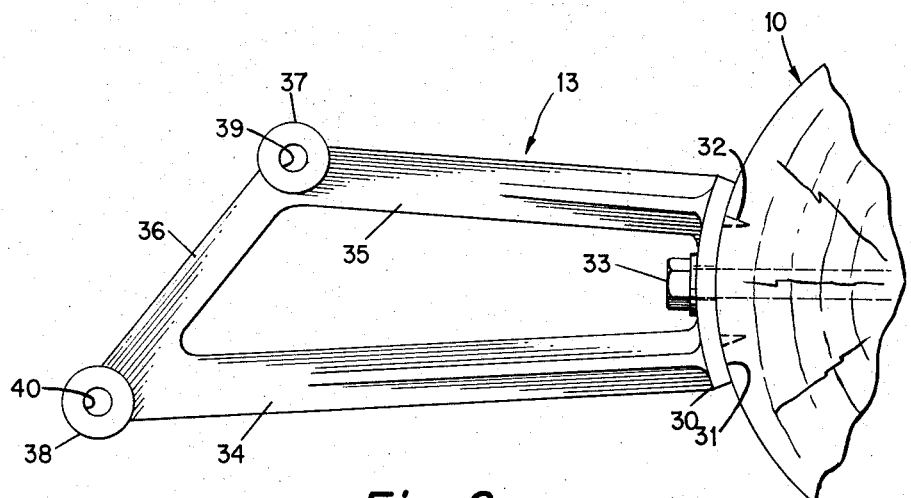
FIGURE 2 is a top view of the bracket in FIGURE 1 shown in the mounted position but without the electrical devices and connections.
Figure 3:
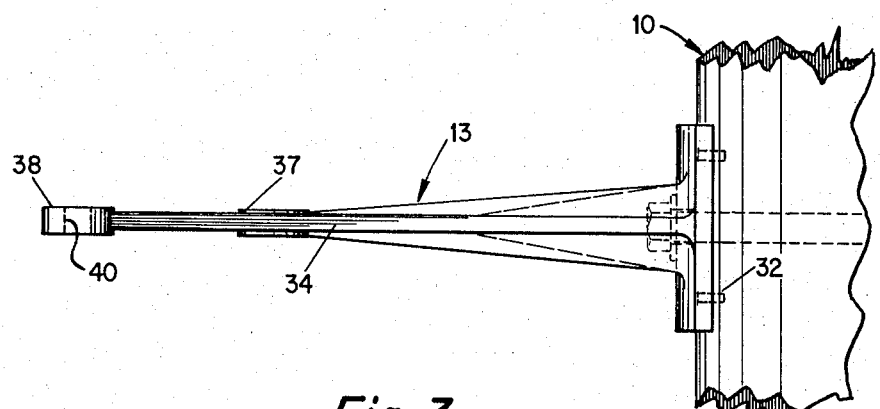
FIGURE 3 is a side elevational view of the bracket shown in FIGURE 2.

Referring now to FIGURES 2 and 3, the preferred embodiment of the invention is shown wherein the bracket 13 comprises a mounting base 30 having a curved inner surface 31 fitting against the pole 10 and from which project integrally formed anchor teeth 32 which are adapted to become imbedded in the pole 10 upon tightening a fastener 33. Also formed integrally with the base 30 are a pair of mounting arms 34, 35 spaced from each other and diverging laterally in a common horizontal plane. Each arm 34, 35 is joined at the outer end by a transverse arm 36. At the juxtaposition of the arms 34, 35, 36 are formed bosses 37, 38 providing mounting openings 39, 40.

In accordance with the invention, the mounting arm 35 is shorter than the companion arm 34 giving the bracket 13 a somewhat rhomboidal appearance when viewed from the top as shown in FIGURE 2. Thus, each of mounting openings 39, 40 is spaced from the pole 10 an unequal distance; or in other words, since the arm 35 is foreshortened with respect to the arm 34, the mounting openings 39, 40 are offset with respect to each other, the offset relationship being approximately one third the length of arm 34. That is, if arm 34 is approximately twelve inches in length measured from the center of the mounting opening 40 to where it joins the base 30, then the arm 35 would be approximately eight inches measured from the same respective locations. In this hypothetical example, the transverse arm 36 would be approximately six inches measuring from center-to-center of the mounting openings 39, 40.

Referring again to FIGURE 1, it will normally be provided that the circuit breaker 18 and lightning arrester 22 are attached to the bracket 13 by swivel extensions 40, 41. As shown best in FIGURE 4, the circuit breaker 18 is customarily attached at the end of the larger mounting arm 34 while the lightning arrester 22 is attached to the shorter arm 35. This places the lightning arrester 22 closer to the pole 10 and limits the length of the free end of ground line 20 for reasons explained hereinafter.

Since the mounting openings 39, 40 have their axes parallel to the pole axis, the circuit breaker 18 and lightning arrester 22 each are generally aligned with the pole axis except for a slight outward tilt of the circuit breaker 18 provided by the swivel extension 40 as shown in FIGURE 1. The tilting of circuit breaker 18 is to facilitate servicing from the ground by a lineman where it is sometimes necessary to reach and disconnect switch arm 46 to render the circuit breaker inoperative.

To understand more clearly the requirements for a noninterfering relationship referred to previously, let it be assumed that the arrester 22 is an earlier mentioned type known as an expulsion type arrester in which an explosive charge is detonated to expel the free end 43 of the ground line 20 when a lightning discharge strikes a portion of the distribution system, such as the power line 12. When the explosive charge is fired, the free end 43 can be expected to whip around in an uncontrolled fashion. Should it come into contact with the "hot" portions of the circuit breaker 18, such as the switch arm 46, the power line 12 will be accidentally connected to ground 21. Thus the spacing of the circuit breaker 18 and the lightning arrester 22 is a critical factor to insure that accidental grounding of the power line does not occur. In addition, when servicing the circuit breaker 18, the switch arm 46 is disconnected at the upper end. This end is then free to swing down a considerable distance and may collide or become entangled with the ground line 43 or the pole 10.

Figure 4:
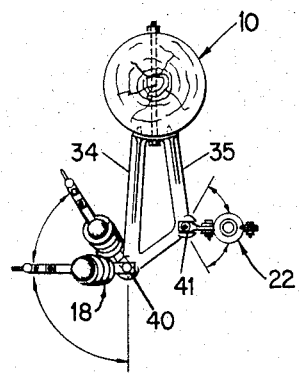
FIGURE 4 is a top view similar to FIGURE 2 showing swivel mounting connections for the electrical devices.

These difficulties are abbreviated by the preferred embodiment of the invention as shown best in FIGURE 4. Due to the unequal lengths of mounting arms 34, 35, the circuit breaker 18 is beyond the plane of the lightning arrester 22. Thus, each unit has its own noninterfering primary plane of operation. Moreover, the swivel extensions 40, 41 permit freedom of adjustment of each electrical device through arcs of about 120 degrees so that several secondary planes of operation may be utilized without bringing about an interference problem either of the electrical devices with each other or with the pole 10.

Figure 5:
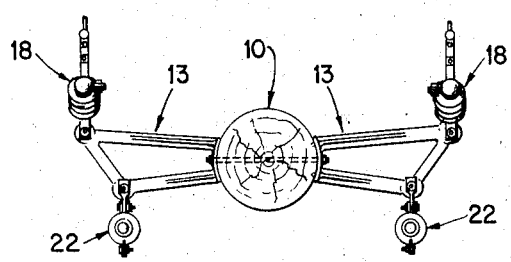
FIGURE 5 is illustrative of one of several mounting arrangements which may be employed showing two brackets mounted on opposite sides of the pole.

Referring now to FIGURE 5, one of several possible mounting combinations of the bracket is shown wherein two brackets 13 are mounted on opposite sides of the pole 10. In this arrangement, two pairs of circuit breakers 18 and lightning arresters 22 are mounted in noninterfering relationship in the manner taught by the invention.

Having now described a preferred embodiment of the invention, it will be appreciated by those skilled in the art that certain modifications may be made without departing from the invention as defined by the appended claims except insofar as limited by the prior art.

I claim:

1. In combination with a utility pole, a mounting bracket adapted to mount a plurality of electrical safety devices thereon comprising
    a base having a curved inner surface fitting against the curved outer surface of the pole,
    anchor means on the base cooperating with the pole to prevent relative movement, and
    a pair of mounting arms extending outwardly from the base each diverging laterally in a common horizontal plane, and having a mounting opening at the outer end, one of the arms being considerably shorter than the other so that the openings are offset with respect to each other whereby separate noninterfering primary planes of operation are provided for each electrical device.

2. The combination as set forth in claim 1 wherein swivel means are provided in each mounting opening for supporting the electrical devices so that a plurality of nointerfering secondary planes of operation are available for each of said electrical devices.

3. The combination as set forth in claim 1 wherein the anchor means comprises a plurality of inwardly extending teeth on the inner surface of the base and a single fastener passes through the base of the bracket and the pole whereby the bracket is drawn against the pole imbedding the teeth therein to prevent relative movement.

4. A bracket adapted to mount electrical devices directly to a utility pole comprising
    a base,
    a pair of mounting arms extending outwardly from the base each having an opening at the outer end thereof,
    and a diagonally extending arm joining the outer ends of said pair of mounting arms, said arms extending in a common horizontal plane, and
    one of said pair of mounting arms being shorter than the other, but at least half the length of the longer mounting arm so that the mounting openings are offset with respect to each other whereby separate non-interfering primary planes of operation are provided for each electrical device.

5. A bracket as set forth in claim 4 comprising in addition,
    swivel means extending from a mounting opening to provide an intermediate support for one of the electrical devices whereby a plurality of secondary non-interfering planes of operation are provided for said device.

References Cited

UNITED STATES PATENTS

| | | | |
|---|---|---|---|
| 1,616,360 | 2/1927 | Foster | 248—67.7 |
| 2,058,611 | 10/1936 | Merkle | 248—221 |
| 2,255,530 | 9/1941 | Pittman et al. | 248—67.7 X |
| 3,065,945 | 11/1962 | Newsome | 174—148 X |

ROY D. FRAZIER, *Primary Examiner.*

R. P. SEITTER, *Assistant Examiner.*